INVENTOR.
JOHN W. PETERSON

INVENTOR.
JOHN W. PETERSON

Jan. 12, 1960    J. W. PETERSON    2,920,649
LIQUID FLOW CONTROL VALVE ASSEMBLY
Filed July 28, 1953    10 Sheets-Sheet 7

INVENTOR.
JOHN W. PETERSON
BY
ATTORNEYS

*INVENTOR.*
JOHN W. PETERSON
BY
ATTORNEYS

Jan. 12, 1960   J. W. PETERSON   2,920,649
LIQUID FLOW CONTROL VALVE ASSEMBLY
Filed July 28, 1953
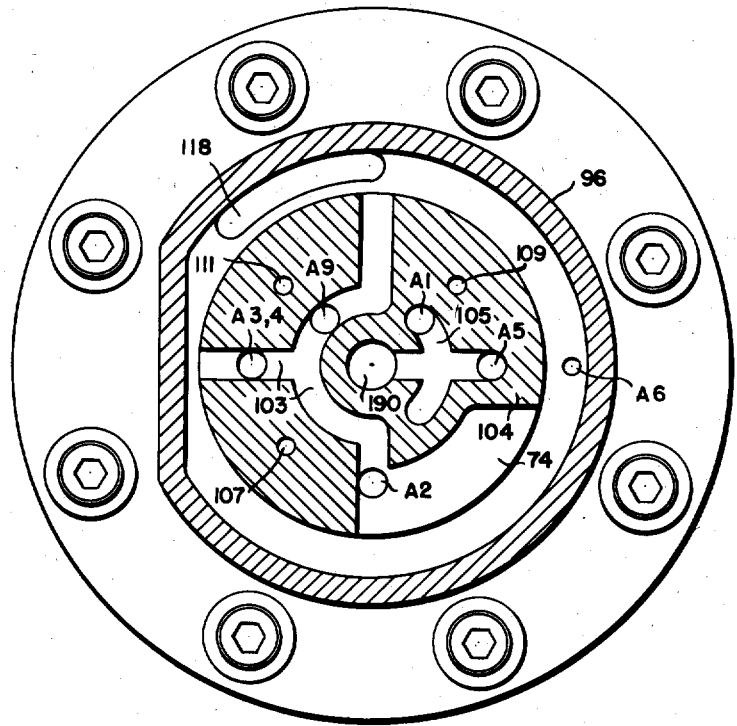
FIG. 13.
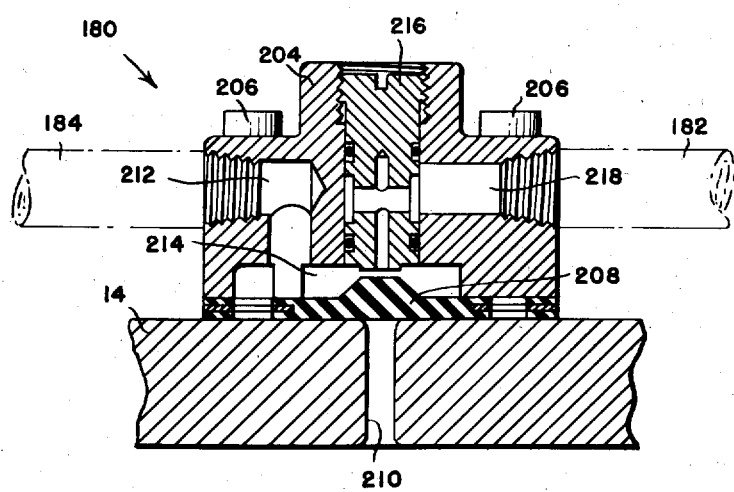
FIG. 14.
INVENTOR.
JOHN W. PETERSON
BY 
ATTORNEYS

United States Patent Office 2,920,649
Patented Jan. 12, 1960

2,920,649
LIQUID FLOW CONTROL VALVE ASSEMBLY

John W. Peterson, Drexel Hill, Pa., assignor to Cochrane Corporation, Philadelphia, Pa., a corporation of Pennsylvania Application July 28, 1953, Serial No. 370,718

8 Claims. (Cl. 137—608)

This invention relates to a liquid flow control valve assembly for the control and operation of liquid handling equipment such as ion exchange or filtration equipment and the like. The liquid flow control valve assembly disclosed herein represents an improvement over the flow control valve assembly disclosed in the patent application of John G. Williams, Serial No. 116,264, filed September 17, 1949, now Patent No. 2,713,556, and is adapted to be used in control liquid handling equipment of the type disclosed therein.

In ion exchange, filtration, and other types of liquid treating equipment it is generally necessary to recondition the contents of the treatment tank at periodic intervals. The steps involved in reconditioning generally include operations of flushing or washing and the application of a regenerant.

In ion exchange systems involving either acid or alkali treatment, the liquid treating materials, after a period of use, become deactivated and require regeneration. Briefly, in ion exchange equipment regeneration involves a sequence of backwashing wherein water is passed through the ion exchange material container as a reverse flush and then to waste or drain; regenerating wherein a regenerating solution is passed through the ion exchange material container and then to drain; and rinsing whereby fresh water is passed through the ion exchange container washing the residual regenerant solution from the ion exchange material container to drain. After regeneration the system is restored to service connections for normal operation.

In filtration equipment of the type characterized by employing supplementary flocular adsorbent or absorbent beds, the sequence of reconditioning generally employs the operations of backwashing wherein water is passed through the filtration bed as a reverse flush and thence to drain; reconditioning wherein a suspension carrying a floc such as an aluminum hydroxide or other material is passed into the filter bed reestablishing the layer of flocular material on the surface of the bed, the liquid carrier passing to drain; and rinsing whereby the residual reconditioning suspension fluid is washed from the filtration bed to drain, leaving only the insoluble material in the filter. After reconditioning the system is restored to service connection for normal operation.

It should be noted that throughout this disclosure the word "regeneration" will be used as applying to both regeneration of ion exchange materials and reconditioning of filter beds.

In ordinary filtration equipment employing agitation but not requiring a chemical regenerant solution, the regenerating operations generally include the steps of agitation wherein water is passed to a surface agitating means for the purpose of stirring up materials deposited on and in the surface of the filtration bed; backwashing wherein the water is passed through the filter as a reverse flush to remove or pass to drain the materials which have settled thereon; and rinsing whereby water is passed through the filter in a normal direction and to drain in order to settle and flush the filter bed in preparation for service. After regeneration the system is restored to service connection for normal operation.

These systems of liquid treatment involve establishing and controlling connections between a treatment tank, a regenerant tank or an agitator, an untreated liquid supply, a drain line and a treated liquid service line. The present invention has to do with an improved type of control valve whereby these connections are effected.

Customarily, liquid handling systems control valves have four positions of operation and control the four major steps or stages of operation, namely, service, backwash, regenerate and rinse; or in case of filtration systems, the operations of service, agitate, backwash and rinse.

The control valve disclosed herein may provide, in addition to these conventional control positions, control positions as follows:

(1) A control valve position in which the valve will shut off all connections in the system as an emergency quick shut-off.

(2) A control valve position in which the valve will shut off all connections in the system except the drain which allows drainage of the liquid flow control valve assembly and at least a portion of the treatment tank.

(3) A control valve position in which the valve will shut off all connections in the system except the liquid supply of the treatment tank. This position offers utility for standby service where one of a plurality of jointly connected liquid treatment tanks may be made to stand by under pressure without offering service to the line.

It is an object of this invention to provide a liquid flow control valve assembly which will have the advantage of ease of operation under high liquid pressure differentials, independently sequenced opening and closing of the individual ports in the valve during the process of changing the valve flow conditions, individually seating valve units operated from a central pilot valve and contained in a single valve body, and a compact easily operated pilot valve assembly.

It is generally desirable to accomplish a backwash with a reasonably high rate of flow having sufficient force to dislodge and remove various solid particles which may have been carried into the treatment tank with the untreated liquid. In the case of the rinse operation, it is desirable to adjust for a lesser rate of flow and maintain that rate quite accurately in order to provide to the treatment tank a uniformly distributed flow which will rinse and settle the treatment bed.

It is, therefore, another object of this invention to provide inexpensive, compact, accurate, accessible and independent flow rate controls instantaneously effected and operating during the backwash and rinsing operations by regulating the pressure of the operating fluid within individual valve units and controlling each of these flows relative to the pressure of the liquid passing the valve units thereby maintaining accurate and steady control of the flow rate past the valve unit.

As previsouly noted, it is generally desirable to accomplish a backwash with a high rate of flow. In some applications this rate of flow may exceed the normal maximum rate of flow of untreated liquid available at the inlet of the liquid flow control valve assembly. Such a situation may exist, for example, when the liquid flow control valve assembly is associated with a zeolite treatment tank which is preceded by a filter or a group of filters. If the rate of flow required for a proper backwash of the zeolite tank is in excess of the rate of flow available through the preceding filters, it becomes desirable to provide for an independent liquid supply to provide the necessary flow rate for the backwash operation.

It is, therefore, a further object of the invention to provide a liquid flow control valve assembly which is capable of receiving supply liquid at two independent inlets one of which receives the untreated liquid which is conventionally employed for all of the normal operations of the system and the other of which receives an auxiliary supply liquid at a relatively high rate of flow and suitable for reverse flushing the treatment apparatus associated with the liquid flow control valve assembly.

It is a further object of the invention to provide a liquid flow control valve assembly in which this auxiliary liquid supply inlet may or may not be employed as desired for any particular installation without requiring any substantial change being made in the valve structure or arrangement.

It is another object of the invention to provide a liquid flow control valve assembly containing a multiplicity of valve units of the diaphragm type in which the stroke of the valve units is appreciably greater than the strokes heretofore obtainable in diaphragm types of valves thus providing a substantially lower resistance to flow than previously known valves of this type employing the same port diameters were capable of providing.

It is still another object of the invention to provide a liquid flow control valve assembly having a valve body which may be either cast, molded or fabricated and which may be provided with removable front and rear cover plates, the valve body being of such a form that, upon removal of the front and rear cover plates, all of the walls or webs within the valve body forming the various ports and passages therein are completely accessible and thus facilitating the application of a rubber or other suitable lining within the valve body.

Frequently, apparatus of this type is, of necessity, installed in limited space. Thus it is highly desirable that the valve be of a type permitting all of the connections thereto to be made in generally plane alignment to the sides of the valve body, thus avoiding the necessity of making connections to the rear of the valve body and permitting placement of the valve body substantially adjacent to a vessel or a wall or other obstruction. It is additionally desirable that all of the operating mechanism of the control valve assembly, i.e., the pilot valve, the flow rate controllers and the diaphragm valve units be readily accessible from the front of the valve body.

The accomplishment of the foregoing objects and considerations and of other objects of this invention particularly relating to details of construction and operation will become apparent from the following description when read in conjunction with the accompanying drawings, in which:

Figure 13 is a section of the pilot valve assembly taken on the trace 13—13 of Figure 10; and Figure 14 is a section through a flow control regulator taken on the trace 14—14 shown in Figure 1.

Figure 1:
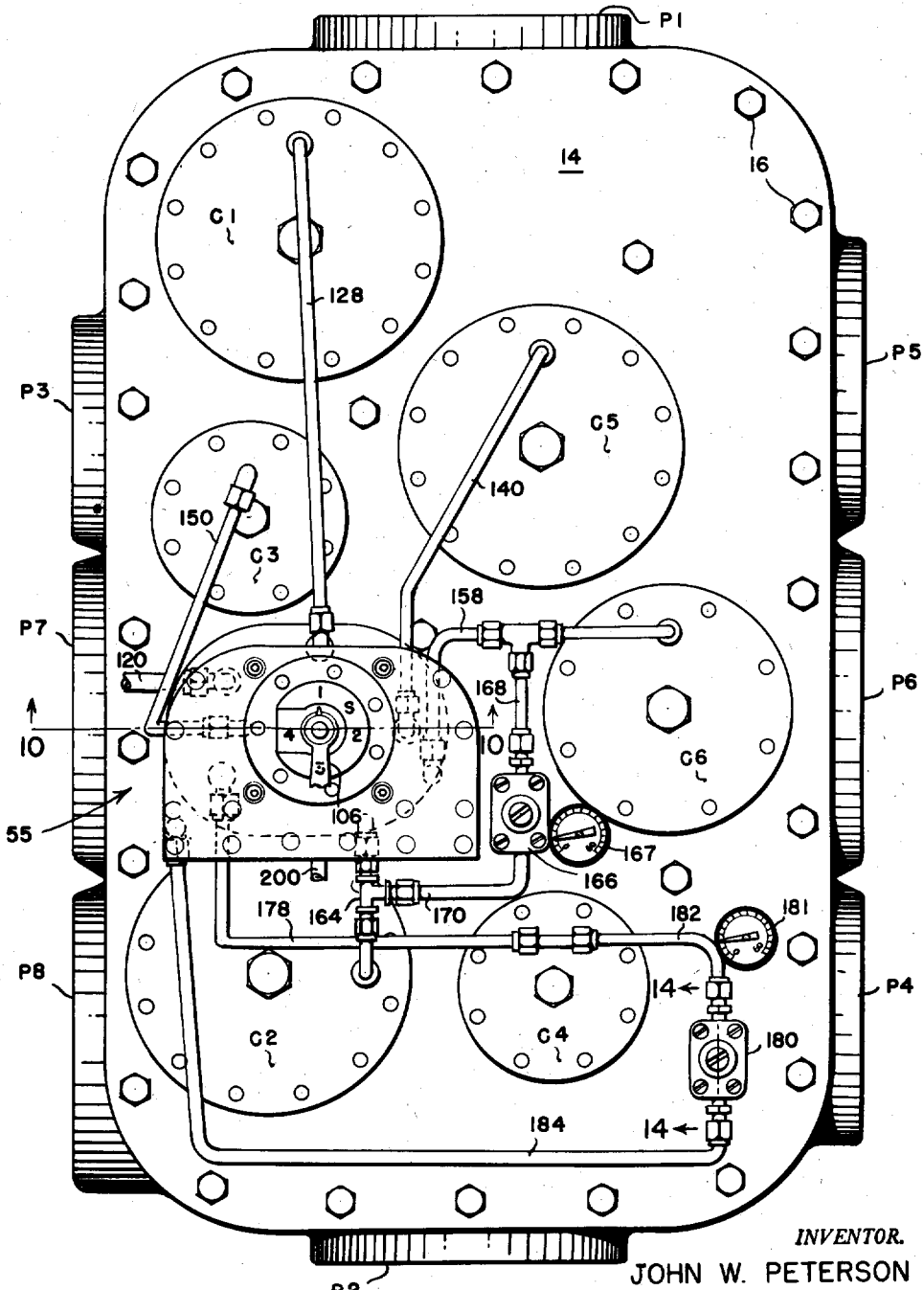
Figure 1 is a front elevation of the valve assembly.

The flow control valve assembly includes a valve body 12 having a front cover plate 14 attached thereto by bolts 16 and spaced therefrom by a sealing gasket 18, and a rear cover plate 20 attached thereto by bolts 22 and spaced therefrom by a sealing gasket 24.

The left-hand side of the valve body, as viewed in Figure 1, is provided with ports P3, P7 and P8 which are adapted to be connected with the eductor, the untreated water supply and an auxiliary water supply, respectively. The right-hand side of the valve body, as viewed in Figure 1, is provided with ports P5, P6 and P4 which are adapted to be connected with the service line, the backwash water drain and the regenerant and rinse water drain, respectively. The top and bottom of the valve body are provided with ports P1 and P2, respectively, which are adapted to be connected to the top and bottom, respectively, of a liquid treatment vessel with which the flow control valve assembly is adapted to be employed. The valve body in the region of each of the ports is provided with a boss adapted to receive suitable pipe connections.

The valve body 12 is of generally rectangular form and includes a left side flange 26 containing the ports P3, P7, and P8, a right side flange 28 containing the ports P5, P6 and P4, a top flange 30 containing the port P1 and a bottom flange 32 containing the port P2. The four flanges are joined by curved portions forming the corners of the valve body. While the valve body is preferably of rectangular form, it will be evident that this rectangular form may be modified so long as provision for the various ports and passages within the valve body, as will be hereinafter described, are maintained.

An irregular transversely extending partition plate 34 extends between the peripheral valve body flanges approximately midway between the front and rear faces thereof but forwardly of the ports in the flanges. Front and rear partition plates or webs 36 and 38, respectively, extend forwardly and rearwardly from the transverse partition plate 34 and terminate on planes flush with the front and rear faces of the valve body flanges 26—32. The outwardmost edges of the front and rear partition plates or webs 36 and 38 are adapted to be engaged by the sealing gasket and serve, in conjunction with the cover plates, the flanges and the partition plate, to provide chambers within the valve body which are connected to the various ports and valve passages within the body as will be described.

Valve passages or tubes T1—T6 are mounted in the transversely extending partition plate 34 and extend forwardly therefrom toward the front cover plate. A plurality of valve cover plates C1—C6 are bolted to the front cover plate 14 in positions over their respective valve passages T1—T6. Diaphragm valve assemblies D1—D6 are positioned below the cover plates C1—C6 and extend through bores in the front cover plate 14 covered by the valve covers and cooperate with the valve tubes in order to control the flows through the valve body as will be described.

Figure 2:
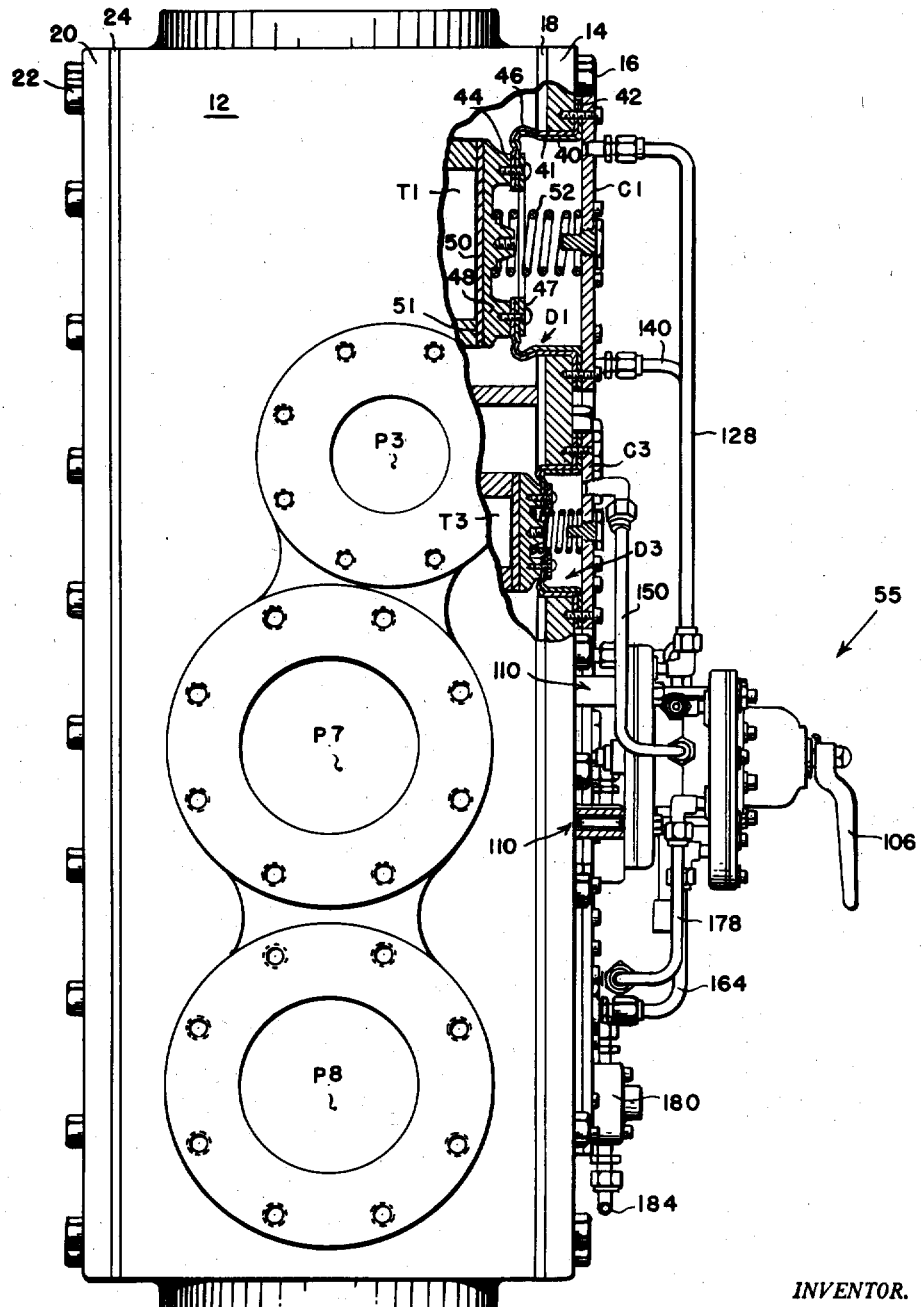
Figure 2 is a partially cut-away side elevation of the valve assembly showing the left-hand side thereof as viewed in Figure 1.
Figure 3:
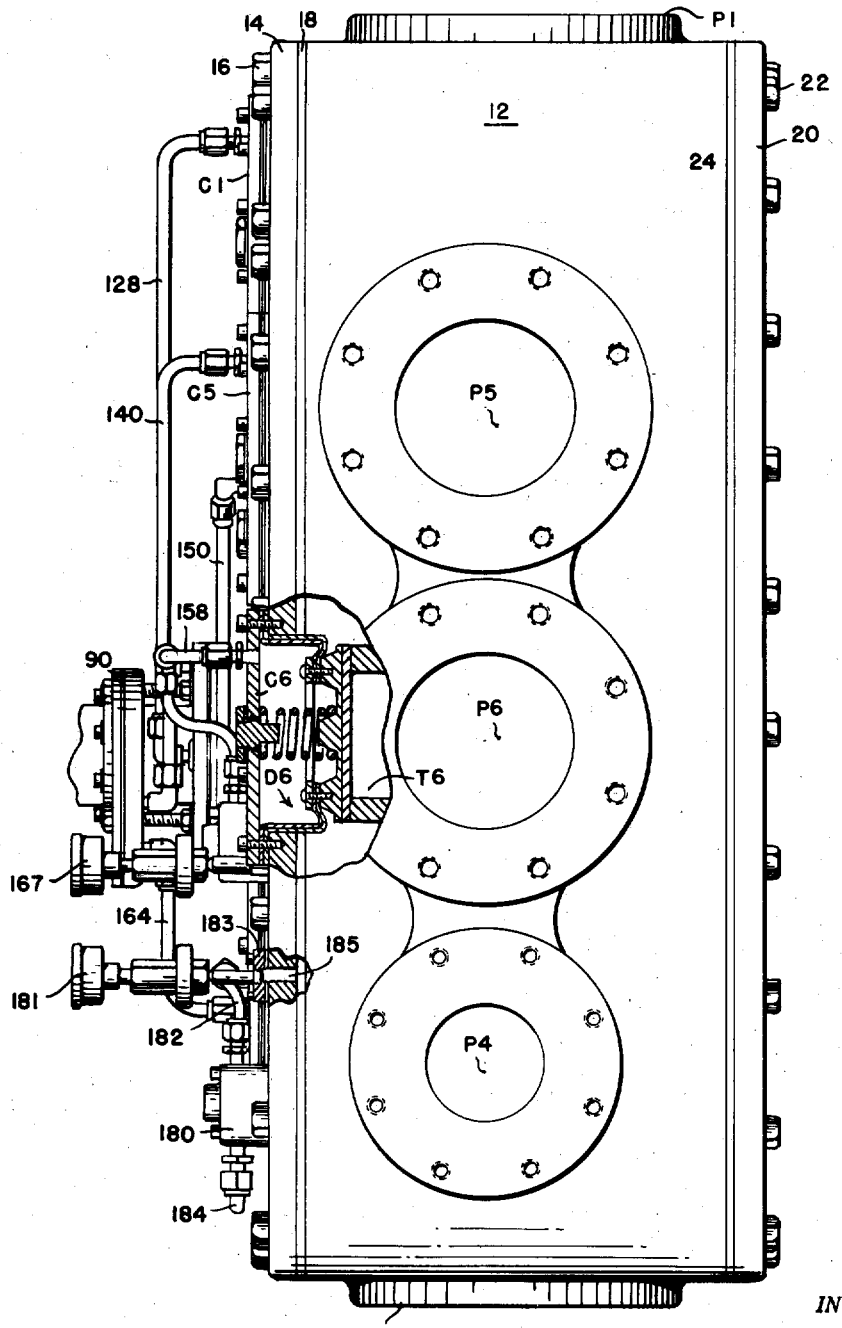
Figure 3 is a partially cut-away side elevation of the valve assembly showing the right-hand side of the valve as viewed in Figure 1.
Figure 4:
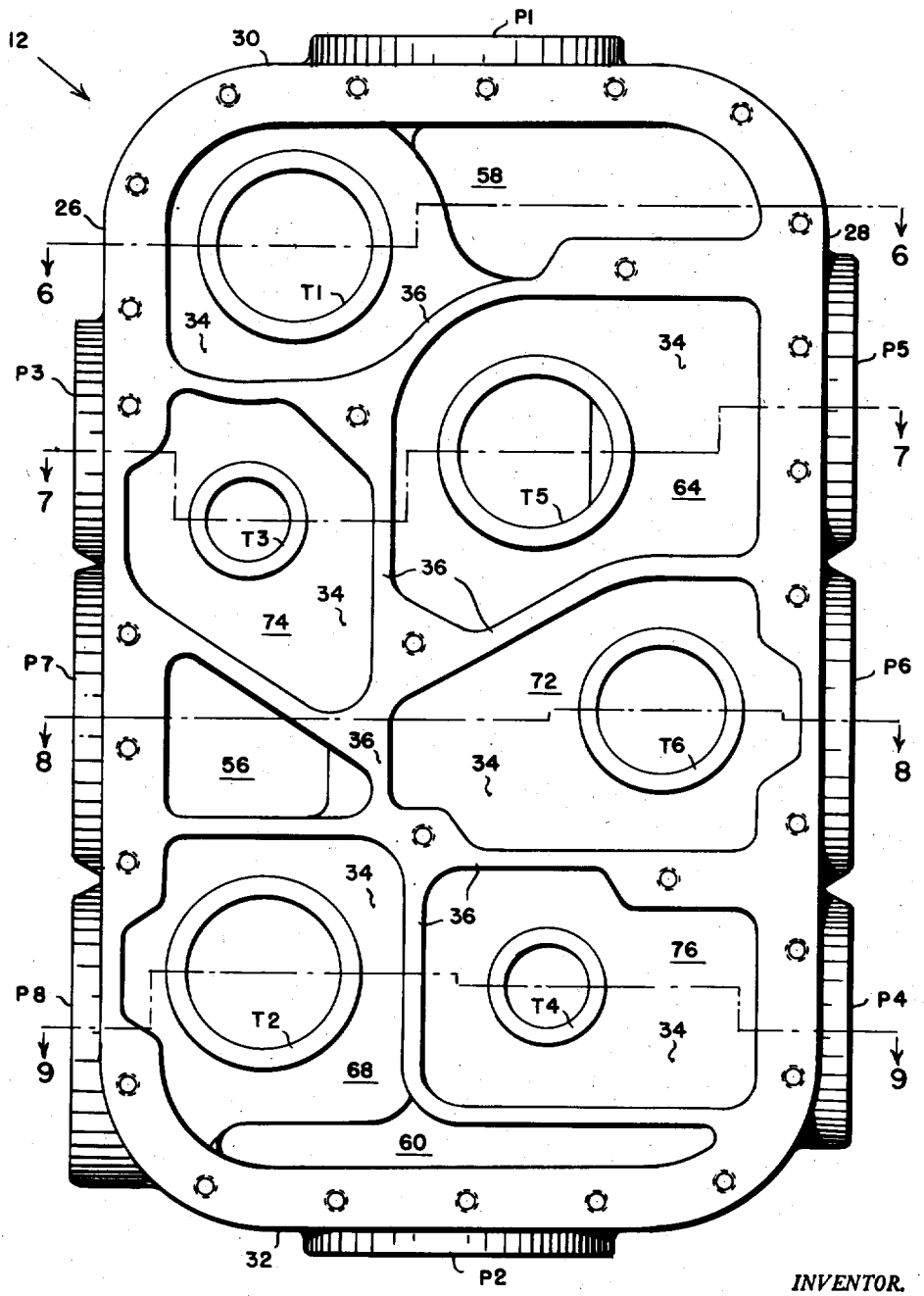
Figure 4 is a front elevation of the valve body with the front cover plate removed.

The diaphragm assemblies are all of similar form but vary in dimension, stroke and ability to withstand pressure. Typical diaphragm assemblies are shown in Figures 2 and 3. In Figure 2 there is shown a valve cover C1 bolted to cover plate 14 over a bore therein and over the valve tube or pasage T1 and a diaphragm valve assembly D1. The diaphragm assembly includes a cylindrical member 40 having an outwardly turned peripheral flange 42 at the upper end thereof which is adapted to be engaged between the cover plate C1 and the body cover plate 14. The cylindrical member 40 is provided with an inwardly turned flange 44 at the lower end thereof which is attached to a valve plate 48 by means of a clamping ring 47 which is held in position by a ring of bolts threaded into the upper face of the valve plate 48. The valve plate is provided with a facing 50 adapted to engage the upper rim 51 of the associated passage T1. The facing 50 is preferably formed of rubber or other resilient material in order to provide a liquid-tight seal against the upper rim of its associated tube T1. The valve plate 48 is made of metal or plastic or other suitable material. The diaphragm member 40 is formed of rubber or other suitable flexible material molded into engagement with a fabric lining 41. The fabric lining is formed of a synthetic fiber such as nylon which may be deformed as a result of having thermoplastic properties.

The diaphragm assembly is provided with a spring 52 positioned between the valve plate 48 and the cover plate C1. The spring acts to urge the valve to a closed position.

It will be observed, by viewing the diaphragm assemblies D1 and D3 of Figure 2 and D6 of Figure 3, that the length of the cylindrical portion 40 of the diaphragm is substantial when compared with the diameter thereof. Additionally, the diaphragm is provided with an extended roll or bead 46 in the region where the inwardly turned flange 44 joins the lower end of the cylindrical portion 40. This structure permits a great amount of upward travel of the valve plate 48 without limit imposed thereon by the diaphragm and thus provides a control valve having very low resistance to flow when in an open position.

It is necessary in the construction of valve diaphragms of this type that the diaphragm be reasonably flexible and, at the same time, have sufficient strength to prevent deformation or "ballooning" under liquid pressures. Thus it is necessary that the diaphragm be provided with the fabric lining. It will be further evident that a conventional type of fabric cannot be molded from a tubular form, such as is necessary to provide the portion 40 of the diaphragm, and provide inwardly and outwardly turned flanges such as flanges 42 and 44 and a roll or bead 46 adjacent to the flange 44. The diaphragm structure described can only be provided in molded form and it is the utilization of a thermoplastic fiber molded into the diaphragm which makes possible the formation of a diaphragm having the proportions of the diaphragm described. It is these proportions which permit the extreme degree of valve plate travel providing the low flow resistance obtained by this valve.

It should be particularly noted that the outwardly turned upper flange and inwardly turned lower flange in conjunction with the rolled portion 46 makes it possible for the lower flange and the valve plate 48 attached thereto to pass upwardly within the cylindrical portion 40 of the diaphragm to the cover plate. Thus an exceptionally long stroke is obtained which obviously minimizes the resistance to flow afforded by the valve assembly.

The chamber formed by the diaphragm D1, valve plate 48 and cover plate C1 receives a supply of control liquid as will be hereinafter described which serves to force the valve plate downwardly and into engagement with the upper rim 51 of its associated tube T1. Inasmuch as the cross-sectional area of the space within the tube T1 is less than the area of the upper surface of the valve plate 48 exposed to pressure within the diaphragm D1, it will be evident that a closing force will exist in the valve when the pressure existing within the diaphragm D1 is equal to the pressure existing in the tube T1, this force being in addition to the force of the spring 52.

It is desirable to include the spring 52 in order to insure adequate closing force upon the valve diaphragm not only during intervals when there exists a low pressure differential but also during shut-down periods when control liquid is removed from the pilot valve and it is desired that the diaphragm valves be maintained closed. Generally, the spring force selected is sufficient to support a head of water equivalent to the head existing within the treatment tank. It is additionally desirable to include the spring 52 in the valve assemblies in order that sufficient force is imposed upon the valve diaphragm to insure tight shut-off during normal operation of the apparatus.

Figure 10:
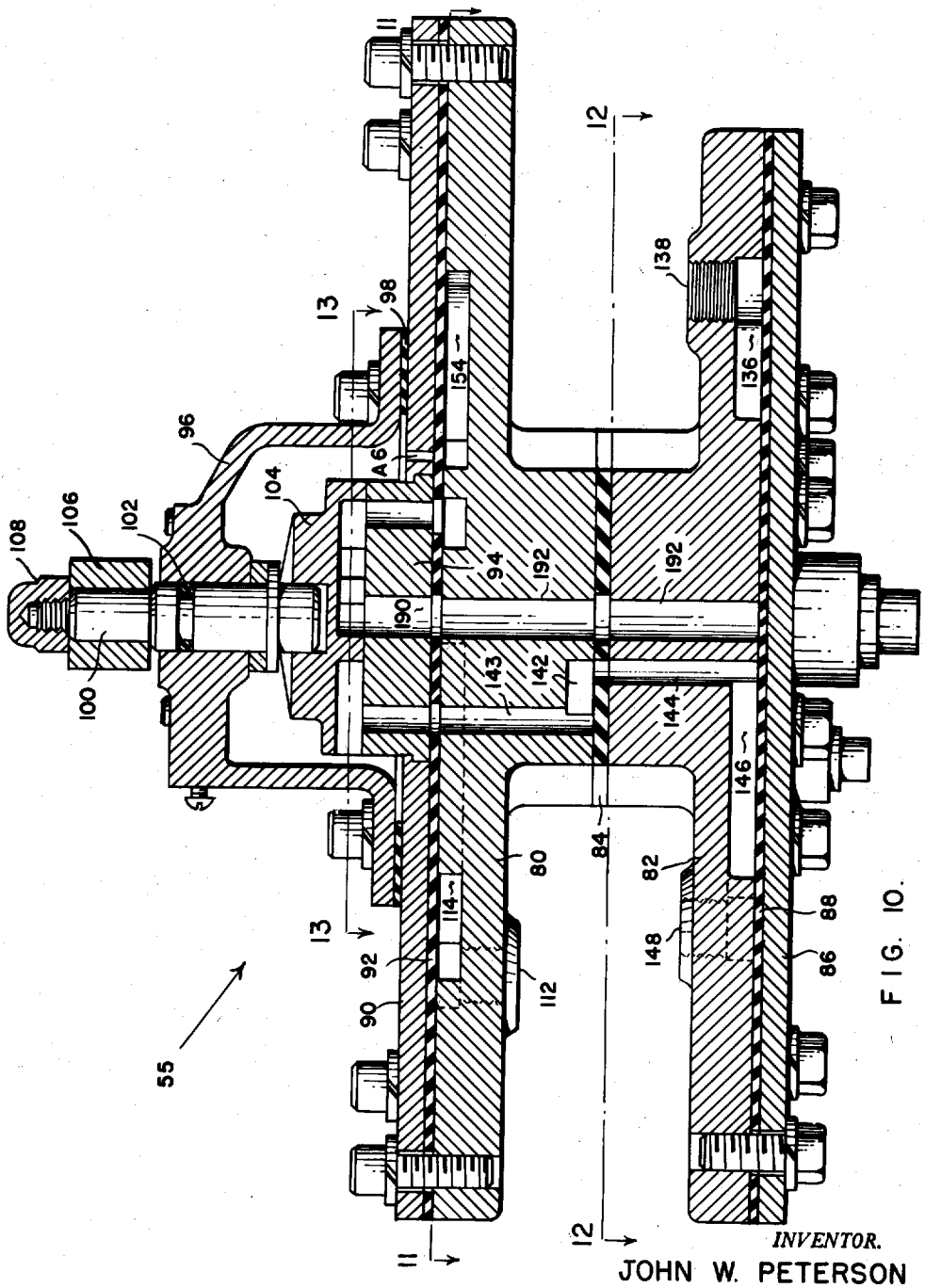
Figure 10 is a transverse section through the pilot valve assembly mounted on the cover plate of the flow control valve assembly and taken on the trace 10—10 as shown in Figure 1.

Each of the valve asesmblies is similar to that described in connection with diaphragm D1 and each receives operating fluid from the pilot valve assembly which is shown generally at 55 in Figures 1 and 10 and will be described hereinafter.

As hereinbefore noted, when the pilot valve is positioned in the 3–4 position, a valve body drain condition may be established. This is true, however, only if the spring 52 is eliminated from the rinse drain valve V4. It is noted, however, that the tube T4 associated with the rinse valve is generally considerably smaller in diameter than any of the other tubes in the valve body. Thus the pressure differential acting on the diaphragm valve D4 is greater than that existing on any of the other valve assemblies. Thus it is possible to operate the apparatus in a satisfactory manner with this one spring omitted and to thereby secure the benefits of the valve body drain condition noted above and hereinafter set forth in greater detail.

The flow paths through the valve body during the various conditions of valve operation may now be described in conjunction with the following chart showing the valve positions during each of the conditions of flow.

|  | V1 | V2 | V3 | V4 | V5 | V6 |
|---|---|---|---|---|---|---|
| 1 Service | O | C | C | C | O | C |
| 1–2. Off | C | C | C | C | C | C |
| 2. Backwash Flush | C | O | C | C | C | O |
| 2–3. Off | C | C | C | C | C | C |
| 3. Regenerate | C | C | O | O | C | C |
| 3–4. Valve Body Drain | C | C | C | O | C | C |
| 4. Rinse | O | C | C | O | C | C |
| 4–1. Standby | O | C | C | C | C | C |

The legends V1—V6 refer to the entire diaphragm assembly which has been described as being a combination of the cover plates, diaphragms, valve body members and valve passages acting in combination. The letter "O" indicates that the valve assembly is open permitting flow therethrough and the letter "C" indicates that the valve assembly is closed and flow therethrough is prevented.

During the service operation, the valves V1 and V5 are open and all of the other valves are closed. This valve condition permits the flow of supply liquid entering port P7 to pass through chamber 56 to chamber 57 behind the transverse partition plate 34 to the valve passage T1. The valve V1 being opened, the flow passes through the passage T1 and into the chamber 58 connected with the port P1. The flow leaving the port P1 passes to the top of the liquid treatment tank associated with the flow control valve. The liquid returning from the liquid treatment tank enters the flow control valve through P2 and passes through passages 60 and 62 to the valve passage T5 past the open valve assembly V5 and into the chamber 64 which is connected to the outlet port P5 connected to service.

A backwash flow sequence is controlled by opening the valves V2 and V6 and closing the remainder of the valves. Under these conditions of flow, auxiliary liquid enters port 8 and passes through chamber 66 to passage T2, past the valve assembly V2 which is open through chambers 68 and 60 and out of the valve body through port P2 to the treatment tank. The liquid returning from the treatment tank enters the valve body through port P1 and passes through passages 58 and 70 to passage T6, past the valve assembly V6 which is open into the chamber 72 and out through the port P6 to the backwash drain.

During the regeneration cycle the valves V3 and V4 are open and all of the remaining valves are closed. Supply liquid enters the valve port P7 and passes through the chambers 56 and 57, through the valve passage T3 and the open valve assembly V3 to the chamber 74 which is connected with the port P3 through which the liquid leaves the control valve assembly and passes to an eductor or other suitable means whereby a supply of regeneration material may be delivered to the liquid treatment tank. Liquid returning from the liquid treatment tank enters the valve body through port P2 and passes through chambers 60 and 62 to the valve passage T4, past the open valve V4 into the chamber 76 and out of the valve body through the port P4.

During the rinse cycle the valves V1 and V4 are opened. Supply liquid enters the valve body through port P7 and passes through chambers 56 and 57, through the valve passage T1 past the open valve assembly V1 to the chamber 58 and out of the valve assembly through the port P1 through the top of the liquid treatment tank. Liquid returning from the liquid treatment tank passes into the valve body through port P2 and passes through the chambers 60 and 62 to the valve passage T4, through the open valve assembly V4, to the chamber 76 and out of the valve body through port P4 to the rinse drain.

Figure 5:
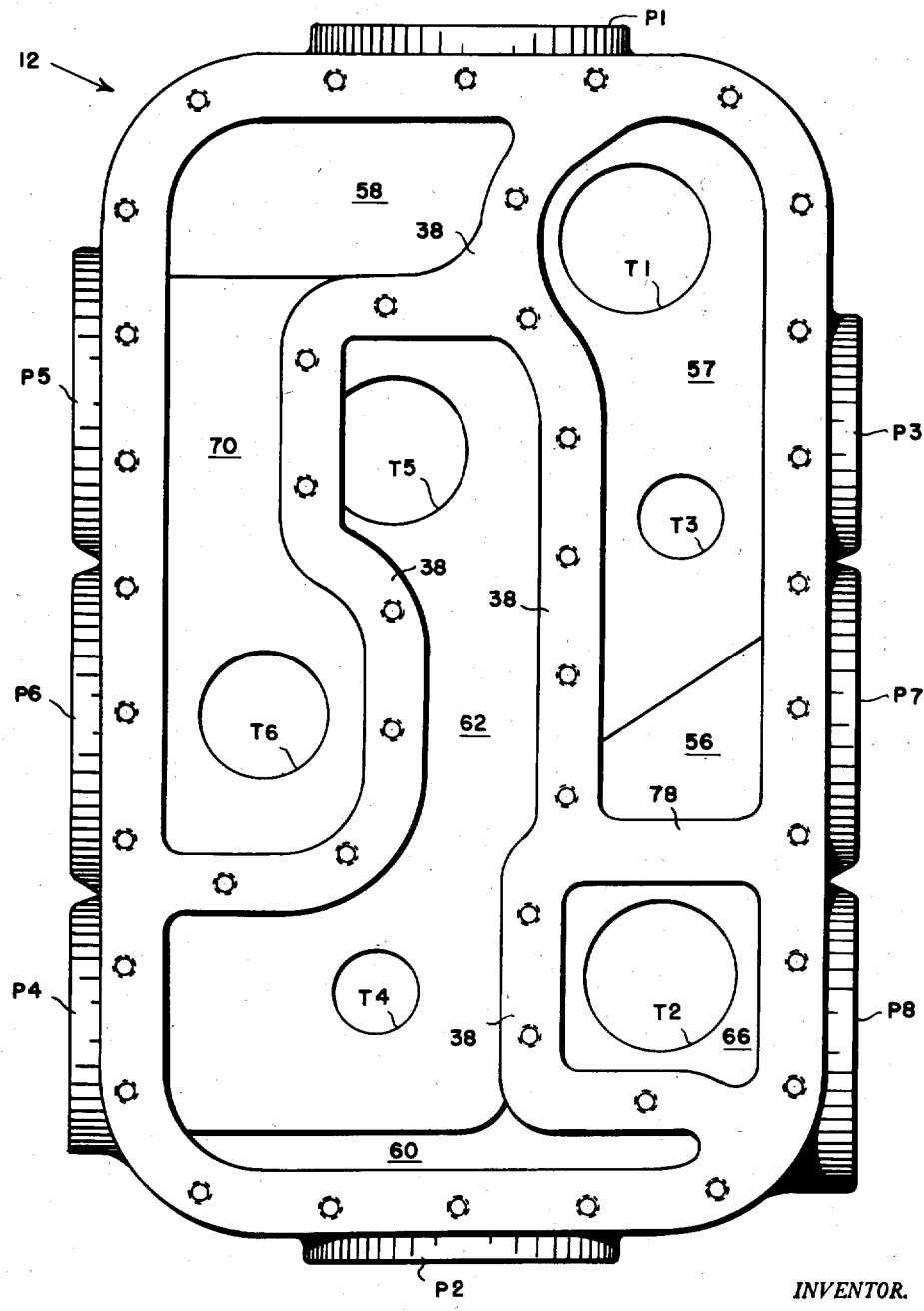
Figure 5 is a rear elevation of the valve body with the rear cover plate removed.
Figure 6:
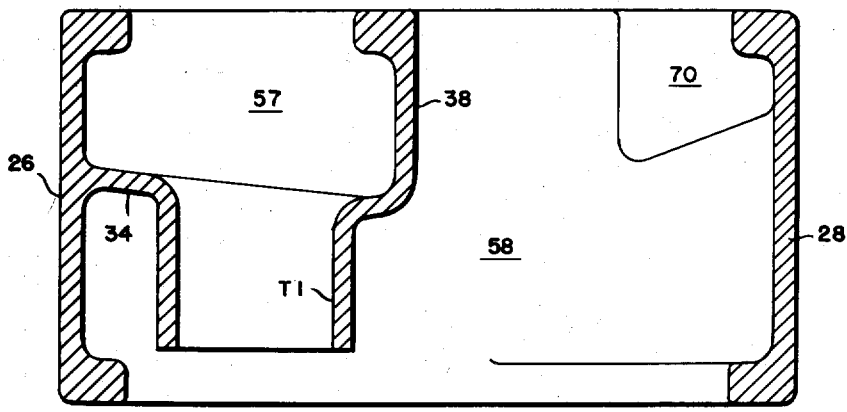
Figure 6 is a transverse section taken through the valve body on the trace 6—6 as indicated in Figure 4.
Figure 7:
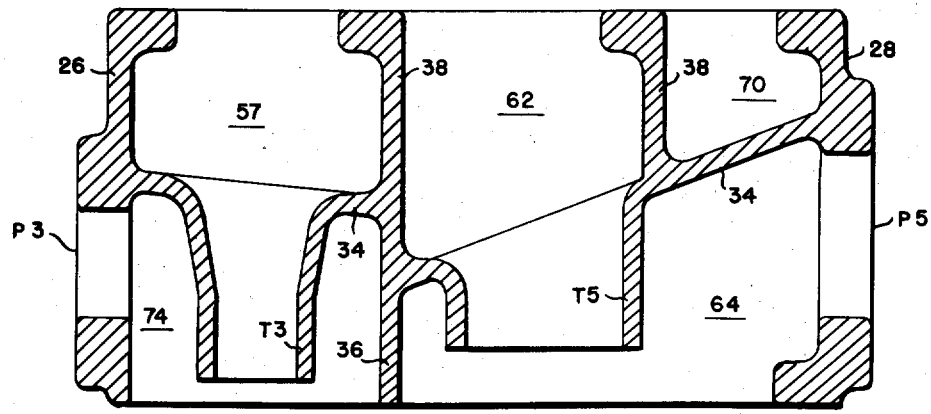
Figure 7 is a transverse section taken through the valve body on the trace 7—7 as shown in Figure 4.
Figure 8:
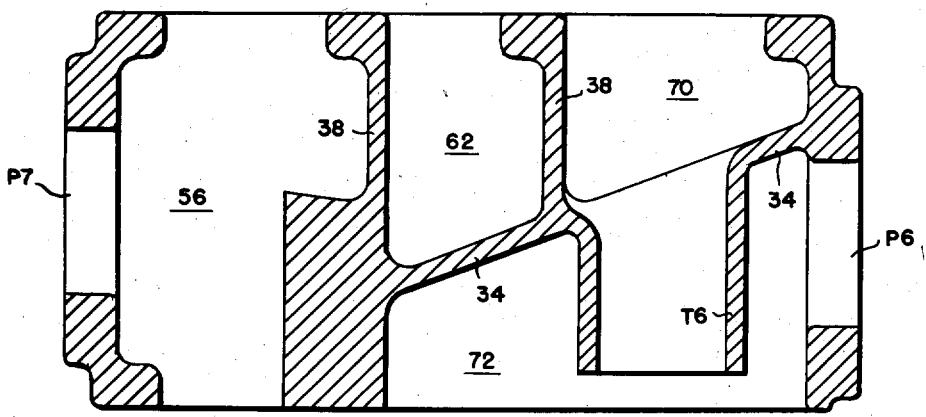
Figure 8 is a transverse section taken through the valve body on the trace 8—8 as shown in Figure 4.
Figure 9:
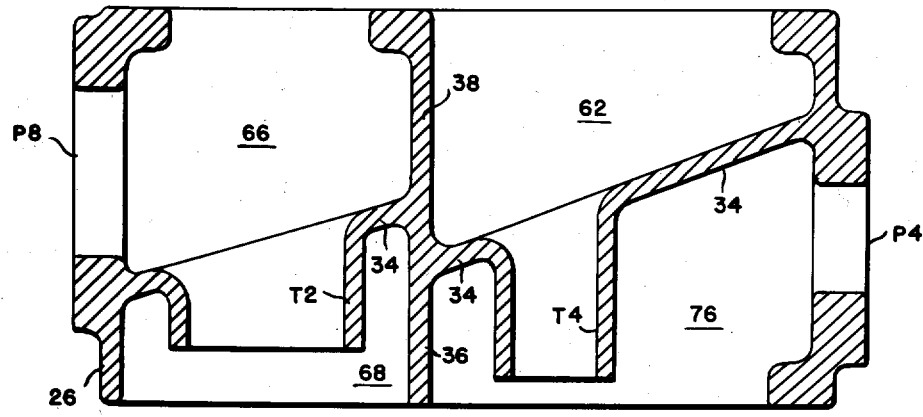
Figure 9 is a transverse section taken through the valve body on the trace 9—9 as shown in Figure 4.

As will be evident, from viewing Figure 5, the supply of untreated liquid entering port P7 is delivered through chamber 57 to the valve passages P1 and P3. The auxiliary liquid entering the valve through port P8 is delivered through chamber 66 to the valve passage T2. If the nature of the apparatus with which the flow control valve assembly is associated is such that it is unnecessary to provide for an auxiliary supply of liquid through port P8 in order to provide the capacity necessary for a reverse flush of the liquid treatment apparatus with which the valve assembly is associated, the partition web 78, as shown in Figure 5, may be removed and the port P8 closed off in which case chambers 56 and 66 will be joined and the normal untreated supply liquid entering the valve body through port P7 will also be delivered to the valve passage T2. Thus, without any further change to the pilot valve mechanism, the control valve assembly will operate to deliver water from the single supply line for service, backwash, regeneration and rinse operations.

If all of the valve assemblies are closed, it is evident that there will be no flow through the control valve assembly. The position 1–2 referred to in the above chart provides a condition where there is no flow through the apparatus, position 3–4 provides for drainage of the liquid flow control valve assembly if spring 52 of valve V4 is omitted, and position 4–1 provides a standby condition in which the treatment tank is filled and under pressure and there is no flow through the system.

Figure 11:
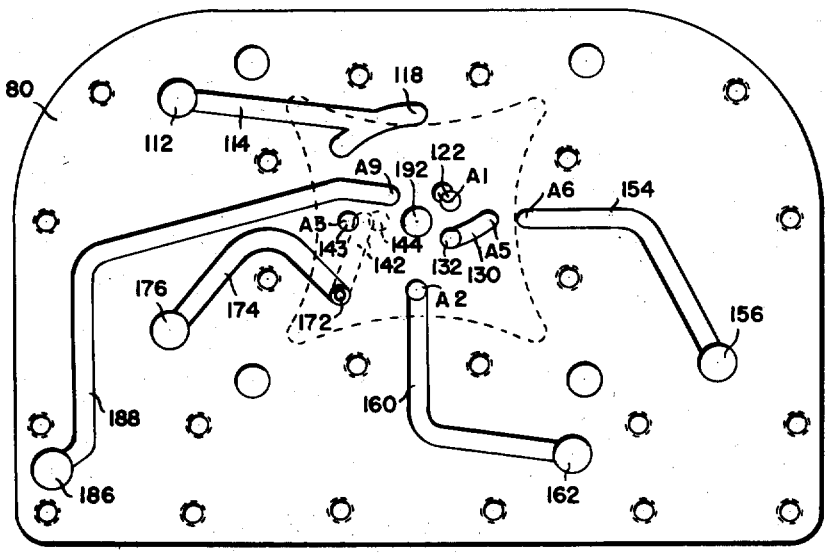
Figure 11 is an elevation of the front distributor plate taken on the trace 11—11 of Figure 10 showing the various ports and passages contained therein.
Figure 12:
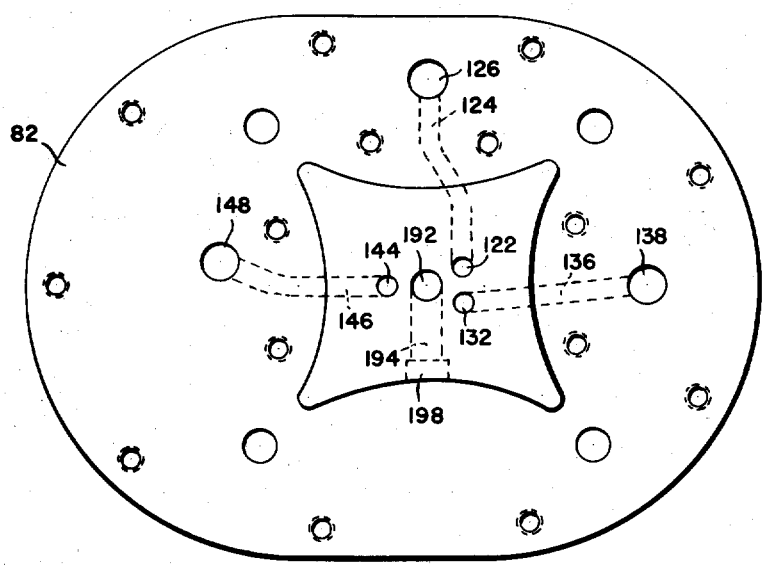
Figure 12 is an elevation of the back distributor plate taken on the trace 12—12 of Figure 10 showing the various ports and passages contained therein.

The foregoing conditions of control valve operation are controlled by the pilot valve assembly which will now be described. The pilot valve assembly is shown generally at 55 in Figures 1, 2 and 10 and details thereof shown in Figures 11, 12 and 13. This valve assembly is substantially identical in structure to that described in detail in conjunction with the above-mentioned patent application of John G. Williams. The pilot valve assembly includes a front distributor plate 80 and a rear distributor plate 82 bolted together in sealing engagement with a gasket 84. A cover plate 86 is bolted against a gasket 88 on the rear face of the rear distributor plate 82. A front cover plate 90 is bolted against a gasket 92 on the front face of the front distributor plate 80. An insert 94 is positioned under a shouldered central bore in the front distributor plate 90 and serves as a stationary pilot valve member as will be described. A pilot valve housing or cover 96 is bolted against the front cover plate 90 and has a rotatable shaft 100 mounted therein perpendicularly to the distributor plates and sealed with respect to the cover 96 by means of O rings or other suitable sealing means 102. A handle 106 is attached to the upper end of the shaft 100 by means of a cap 108 and thus, by operation of the handle 106, the shaft 100 can be made to rotate. Positioned within the cover 96 and attached to the shaft 100 is a rotatable pilot valve member 104 which is adapted to slide upon the surface of the stationary pilot valve member 94. The stationary valve member 94, the distributor plates 80 and 82 and the rotatable valve member 104 are provided with ports and passages in such a manner as to distribute liquid which is supplied under pressure to within the cover 96 to the various diaphragm valve members in order to selectively operate the valve members to provide the flow sequences which have been described. The pilot valve assembly is mounted on bolts and spacers, indicated generally at 110 in Figure 2, which support the pilot valve assembly above the front cover plate 14 of the valve body assembly.

The pilot valve front cover plate is provided with an inlet port 112 which is connected to a passage 114 leading to a passage 118 through which pilot control liquid is admitted within the cover 96. In Figure 1 a pilot valve liquid supply line 120 is shown connected to the inlet port 112. The supply line 120 may be connected to the pipe line connected to the supply port P7 of the valve body or, alternatively, a treated water supply may be employed or, alternatively, an entirely independent source of control liquid may be provided if desired.

The stationary pilot valve member 94 is provided with an aperture A1 which is connected to aligning bores 122 in the pilot valve front and rear cover plates. The bore 122 in the rear cover plate joins the passage 124 and the outlet port 126 therein. A tube 128 connects the outlet port 126 to the chamber within the valve diaphragm under the valve cover C1. An aperture A5 in the member 94 is connected through a passage 130 to aligning bores 132 in the pilot valve front and rear cover plates. The passage 136 in the rear cover plates connects the aligning bores 132 with outlet port 138 to which is connected a pipe line or tubing 140 which delivers control liquid to the chamber within the valve diaphragm under the valve cover C5. An aperture A3 in the member 94 connects with a bore 143 extending through the front cover plate 80. The bore 143 is connected with the bore 144 extending through the rear cover plate by means of a passage 142 in the front cover plate 80. A passage 146 in the rear cover plate joins the passage 144 to the outlet port 148. A pipe or tube 150 is connected to the outlet port 148 and supplies control liquid to the chamber within the valve diaphragm under the valve cover C3.

An aperture A6 is provided through the cover plate 90 of the distributor plate 80 of the pilot valve assembly and connects with a passage 154 which, in turn, is connected to an outlet port 156 to which there is connected a conduit 158 supplying control liquid to the valve chamber under the valve cover C6. An aperture A2 in the member 94 connects with one end of a passage 160 in the front distributor plate. The other end of the passage 160 is connected to an outlet port 162 to which there is connected the pipe line 164 through which control liquid is delivered to the valve chamber under the valve cover C2. A flow rate regulator 166 is connected by means of pipe line 168 to the pipe line 158 and by means of the pipe line 170 to the pipe line 164. The structure and operation of this flow rate controller will be described hereinafter.

The aperture A3, previously described, is also connected through passage 142, and an orifice 172 to a passage 174 which is connected to an outlet port 176. A pipe line 178 is connected to the port 176 and supplies control liquid to the valve chamber under the valve cover C4. A flow rate controller 180 is connected to pipe line 178 by means of a pipe line 182. The flow rate controller 180 is connected through a pipe line 184 to a port 186 to a passage 188 in the pilot valve front distributor plate. The passage 188 is connected to the aperture A9 in the member 94. The structure and function of the rate controller 180 will be hereinafter described.

A central bore 190 in the stationary valve member 94 is in alignment with central bores 192 in the two distributor plates. A passage 194 in the rear distributor plate connects the bore 192 to an outlet port 198 to which there is connected a drain line 200. This drain line may be connected to any suitable drain providing a minimum of back pressure to the discharge of control liquid from the pilot valve assembly.

The movable pilot valve member 104 contains an irregular passage 105 in the surface thereof which is in slidable engagement with the stationary valve member 94. The passage 105 is adapted to connect selected apertures in the stationary valve member to the drain passage 190. The movable member 104 also contains an irregularly shaped passage 103 which is adapted to connect various apertures in the stationary valve member to the liquid under pressure contained within the cover 96. Bores 107, 109 and 111 extend through the movable valve member 104 and are opened to the liquid under pressure within the cover 96. The operation of the bores 107, 109 and 111 in the pilot valve system will be hereinafter described. These bores also serve the purpose of affording water lubrication between the adjacent surfaces of the stationary valve member 94 and the movable valve member 104.

In Figure 14 there is shown generally at 180 a transverse section taken through the regulator 180 of Figure 1 on the trace indicated at 14—14. The regulator includes a body portion 204 which is bolted by means of bolts 206 to the flow control valve assembly front cover plate 14. A diaphragm 208 is positioned between the housing 204 and the cover plate 14. A bore 210 is provided through the cover plate in alignment with the central portion of the diaphragm 208. An inlet passage 218 is provided in the housing 204 and connects with a chamber 214 above the diaphragm 208. An adjustable orifice member 216 is threaded into the housing and is adapted to be positioned immediately above and to have slight clearance from the diaphragm 208. The orifice member is provided with bores connecting the inlet chamber 218 with the chamber 214 in the housing. The regulator 180 has the pipe line 182 connected to the inlet passage 218 thereof and the pipe line 184 connected to the outlet passage 212 thereof. The bore 210 in the case of the regulator 180 is positioned above the chamber 76 through which rinse liquid flows to the valve V4 and to the drain port P4.

The flow regulator 166 is identical in construction to that described in connection with the regulator 180 and is positioned over a similar bore to bore 210 in the cover plate 14. The regulator 166 is, however, connected above the chamber 72 through which liquid flows in passing to the valve V6 to a backwash drain port P6.

A pressure gauge 181 mounted on a plate 183 is attached to the valve assembly front cover plate 14 and is positioned over a bore 185 extending through the front cover plate and connecting with the chamber 76 in the valve body. Thus the pressure gauge 181 indicates the pressure level maintained in the chamber 76 by the action of the flow rate regulator 180. A similarly mounted pressure gauge 167 is positioned over the chamber 72 and serves to indicate the pressure maintained in the chamber 72 by the action of the flow rate regulator 166.

When the pilot valve control handle 106 is in the No. 1 position, as shown in Figure 1, the movable pilot valve member 104 will be in the position shown in Figure 13. This is the service position. In this position control liquid under pressure will be applied to the valve chambers of the various assemblies V2—4 and 6 and these valves will be held in closed position. The valve chambers of the valve assemblies V1 and 5 will be connected to drain and these valves will be opened by the pressure of the liquid in their associated passages T1 and T5 acting against their respective springs 52. Thus liquid flow therethrough will occur. This is the service condition of flow which has been described in conjunction with the foregoing chart. Under this condition the flow rate regulators 166 and 180 both have full control liquid pressure applied to both sides thereof and thus they are inoperative and their associated valve assemblies are closed.

If the pilot valve control handle 106 is rotated to a position midway between position No. 1 and position No. 2, all of the apertures in the stationary valve member will be connected to liquid under pressure. This is the "off" or "S" position indicated in Figure 1. The aperture A3—4 receives pressure through the bore 107 in the movable member and the aperture A5 receives fluid under pressure through the bore 109.

If the pilot valve control handle is positioned in position No. 2 with the movable valve member rotated clockwise for a distance of 90° from that shown in Figure 13, the aperture A2 will be connected to drain through the passages 105 and 190 and all of the other apertures will be connected to liquid under pressure. This is the backwash or reverse flush flow condition described in conjunction with the foregoing chart. With the pilot valve in this position, pressure is removed from the pipe line 164 and from the valve assembly V2. Liquid pressure is also removed from the line 170 connected to the outlet of the flow rate regulator 166. Liquid under pressure is, however, applied to the valve assembly V6 through line 158 and the orifice A6 in the pilot valve assembly.

With the pilot valve in the No. 2 position, if the diaphragm 208 in the flow rate regulator 166 is closed against the orifice in the orifice member 216, there is no drainage of liquid from the pipe lines 158 and 168 through the pipe lines 170 and 164 and thus full control pressure is applied to the valve V6 to close the valve. This condition can only exist, however, when there is sufficient pressure in the chamber 72 acting against the underside of the diaphragm 208 to close the pilot valve. As soon as the pressure in the chamber 72 drops below that value necessary to close the orifice above the diaphragm 208, control liquid is permitted to pass through the flow rate regulator from line 168 to line 170 and thence to drain. The actual pressure maintained within the chamber 72 by the operation of the flow rate regulator will depend upon the diameter of the orifice and the resistance to deformation afforded by the diaphragm 208 and the resistance to discharge of liquid out of the port P4 in the valve body. There is an orifice plate provided either at the port P4 or at the end of the pipe line connecting the port P4 to a drain. It will be evident, however, that the diameter of the port P4 may in itself provide the orifice in order that the pressure within the chamber 72 acting to cause a flow of liquid through the orifice port P4 will give an indication of the rate of flow. Thus by controlling the pressure of the operating fluid within the valve V6 in response to the pressure in the chamber 72 by means of the flow rate regulator 166, the rate of flow through port P4 may be controlled.

It should be noted that this control is maintained regardless of the pressure of the untreated liquid supplied to the control valve assembly. It is further noted that the flow rate control is immediately acting. As soon as the pressure within the chamber 72 rises to a level above the control point, the diaphragm 208 moves to restrict the drainage of control liquid and thus the pressure of the control liquid acting within the valve V6 rises immediately and reduces the rate of flow through T6 past the valve V6. Thus in this system there can be no preliminary surge of liquid at a relatively high rate of flow prior to the operation of the flow control apparatus such as occurs in the more conventional float and weir type of flow rate control.

The pressure gauge 181 indicates the pressure maintained within the chamber 76 which is a criteria of flow through the chamber in response to the action of the flow rate regulator 180 in conjunction with the resistance or orifice through which the flow leaving the port P4 must pass. Similarly, the pressure gauge 167 indicates the pressure maintained within the chamber 72 which is a criteria of flow through the chamber in response to the action of the flow rate regulator 166 in conjunction with the resistance or orifice through which the flow leaving the port P6 must pass.

If the pilot valve control lever 106 is rotated to a position midway between positions 2 and 3, all of the apertures in the movable valve member are connected to pressure and a second off position exists.

If the pilot valve control lever is rotated to the No. 3 position, the apertures A3, 4 and A9 will be connected to drain through the passages 105 and 190 and all of the remaining apertures will be connected to control liquid under pressure. This is the regenerate position referred to in the chart above. In this position the valves V3 and V4 are open as a result of having the operating liquid lines thereto connected to drain and the line 184 from the flow rate controller 180 is also connected to drain through aperture A9. The remaining valves are in a closed position as a result of having the control liquid lines thereto connected to liquid under pressure.

If the pilot valve is rotated to a position midway between the 3 and 4 position, the valve V4 will be open as a result of the connection of the rinse rate regulator 180 connected to drain through the aperture A9. All of the other valves are connected to pressure and closed. Under this condition the liquid treatment tank will drain and the flow control valve body will drain until the level therein has dropped to substantially the level of the lower portion of the port P4.

When the pilot valve is rotated to the No. 4 position, the flow control valve assembly is in the rinse condition in which the valves V1 and V4 are opened as a result of the connection of the apertures A1 and A9 to drain. The remaining valves will be closed due to the delivery of control liquid under pressure thereto. The rinse rate regulator will be operative in this position due to the delivery of liquid under pressure to the valve V4 through the aperture A3, 4 and orifice 172, but chamber 212, Figure 14, is connected to drain through tubes 182, 178 and aperture A9.

When the pilot valve assembly is positioned midway between the 4 and 1 position, the control valve assembly is in the standby condition in which the aperture A1 is connected to drain thus permitting the valve V1 to be opened admitting untreated water under pressure to the treatment tank but all of the other valves are connected to pressure and thus they are all closed preventing any flow through the treatment tank.

As previously noted, it is frequently necessary, particularly in the case of cast iron valve bodies, to line the entire interior surface of the valve body with rubber or other suitable material in order to prevent contact of the liquid undergoing treatment with the cast iron surface of the valve body. In the case of silica removal systems, this is necessary in order to prevent the pick up of silica from the casting by the water being treated. When corrosive liquids are handled, the lining is sometimes necessary in order to prevent undue corrosion of the casting. While in some cases non-corrosive materials such as brass or plastic materials may be employed in place of cast iron, a cast iron valve body coated with sheets of rubber or other suitable lining material is considerably less expensive to produce than brass or plastic valve bodies. Heretofore, considerable difficulty has been encountered in applying such a lining due to the fact that many portions of the interior surface of the valve body were inaccessible. The valve body structure disclosed herein has peripheral side flanges 26, 28, 30 and 32 joined by a generally transversely extending partition plate 34 which is adapted to support the various flow control valve passageways and chamber forming web plates which extend generally perpendicularly therefrom and in parallel relation with the side walls. Such a valve body may be closed off by front and rear cover plates as have been described and, when the cover plates are removed, provides completely accessible interior surfaces which may be lined if desired.

Additional benefit arises from this form of valve structure in that all of the chambers within the valve body may be opened for inspection and cleaning. Additional benefit is obtained by virtue of the fact that all of the flow control valve assemblies and pilot valve operated control mechanism therefor is mounted on the front cover plate making all of this mechanism readily accessible. The structure has the further advantage in that, if trouble develops, the entire front cover plate and all of the control valve mechanisms mounted thereon may be removed as a single element and promptly replaced by a replacement assembly, thus necessitating only a minimum of shut down time for the treatment apparatus.

Still further benefit is obtained from the fact that all of the pipe line connections joining the flow control valve assembly to the liquid treatment system are made through the side walls of the valve body. Thus the valve body may be mounted with its rear surface, i.e., its rear cover plate, positioned closely adjacent to its associated liquid treatment tank, a wall or other barrier. Thus installation of this valve requires only a minimum of space.

It is noted that the diaphragm valves disclosed herein may be replaced by piston valves or bellows valves. The piston valve is, however, considerably more expensive to install and both the piston valve and the bellows valve are less reliable than the type of diaphragm valve disclosed herein. It is also noted that the pilot valve assembly need not necessarily be mounted on the front cover plate of the valve assembly. The only operative connection between the pilot valve and the valve body is through the various tubings connecting the pilot valve to the individual diaphragm valve covers on the front cover plate. Thus, if desired, the pilot valve assembly may be positioned at a distance from the flow control valve body.

What is claimed is:

1. A liquid flow control valve assembly comprising a multiport valve body, chambers in said valve body forming passages between the ports therein, means including a plurality of individual valves for selectively controlling flow of liquid through said chambers between the ports, a cover plate on said valve body covering chambers therein and mounting said individual valves, and means mounted on said cover plate and automatically responsive, independently, of said selective flow control means, to the pressure of liquid in one of the chambers under said cover plate for controlling the operation of one of said individual valves to regulate the rate of flow of liquid through one of the valve body ports.

2. A liquid flow control valve assembly comprising a multiport valve body, chambers in said valve body forming passages between the ports therein, a cover plate on said valve body covering chambers therein, means including a plurality of individual valve members positioned under said cover plate for selectively controlling the flow of liquid through said chambers and between said ports, and means automatically responsive, independently, of said selective flow control means, to the pressure of liquid in one of the chambers under said cover plate for controlling the operation of one of said individual valves to regulate the rate of flow of liquid through one of the valve body ports.

3. A liquid flow control valve assembly comprising a multiport valve body, chambers in said valve body forming passages between the ports therein, a cover plate on said valve body covering chambers therein, means including a plurality of individual valve members positioned under said cover plate for selectively controlling the flow of liquid through said chambers and between said ports, and two individual means automatically responsive, independently, of said selective flow control means, to the pressure of liquid in two individual chambers under said cover plate and each controlling the operation of an individual one of said valve members to independently regulate the rate of flow of liquid through each of two of said valve body ports.

4. A liquid flow control valve assembly comprising a multiport valve body, chambers in said valve body forming passages between the ports therein, a removable cover plate on said valve body covering chambers therein, means including a plurality of individual valve members mounted on said cover plate and extending into chambers thereunder for selectively controlling the flow of liquid through the chambers into which they extend, and two individual means mounted on said cover plate automatically responsive, independently, of said selective flow control means, to pressure of liquid in two individual chambers under said cover plate and each controlling the operation of an individual one of said valve members to independently regulate the rate of flow of liquid through each of two of said valve body ports.

5. A liquid flow control valve assembly comprisng a multiport valve body, a cover plate for said valve body, means within said valve body providing chambers in said valve body forming passages between the ports therein and valve seats, and means including a plurality of indivdual valve assemblies inside of said valve body respectively opposite said valve seats for selectively controlling flow of liquid through said chambers between said ports, each of said valve assemblies including a flexible diaphragm in the form of a sleeve of flexible elastic material reinforced with a flexible inelastic thermoplastic material having flanges at each end thereof, a movable valve member attached to one of said flanges and interposed between said diaphragm and the associated valve seat, and means mounting the other of said flanges on said cover plate, the arrangement providing for the removal of the cover plate from the valve body with the diaphragms and movable valve members assembled thereto.

6. A liquid flow control valve assembly comprising a multiport valve body, a cover plate for said valve body, means within said valve body providing chambers in said valve body forming passages between the ports therein and valve seats, and means including a plurality of individual valve assemblies inside of said valve body respectively opposite said valve seats for selectively controlling flow of liquid through said chambers between said ports, each of said valve assemblies including a flexible diaphragm in the form of a sleeve of flexible elastic material reinforced with a flexible inelastic thermoplastic material having a cylindrical portion and flanges at each end thereof and an outwardly extending rolled portion intervening said cylindrical portion and one of said flanges, a movable valve member attached to said one flange and interposed between said diaphragm and the associated valve seat, and means mounting the other of said flanges on said cover plate, the arrangement providing for the removal of the cover plate from the valve body with the diaphragms and movable valve members assembled thereto.

7. A liquid control valve assembly comprising a valve body having a peripherally extending wall, and means for partitioning the interior of said peripherally extending wall thereby to form a plurality of chambers, said peripherally extending wall being open across the front and rear faces of said valve body thereby to fully expose to view the interiors of said chambers, said chambers each having an open port formed in said peripherally extending wall, a pair of plates removably secured to, and respectively covering the front and rear faces of, said valve body, a plurality of valves for controlling communication between said chambers, said valves being mounted upon the front one of said cover plates and being yieldably biased rearwardly therefrom to seat in closed position upon apertured areas of said partition means, said bias being sufficient to close said valves but insufficient to maintain the same closed against liquid pressure directed thereagainst in valve opening direction, and valve control means manually operable for selectively securing said valves against opening under the influence of liquid pressure directed thereagainst in valve opening direction.

8. A liquid control valve assembly comprising a valve body having a peripherally extending wall, and means for partitioning the interior of said peripherally extending wall thereby to form eight chambers, said peripherally extending wall being open across the front and rear faces of said valve body thereby to fully expose to view the interiors of said chambers, said chambers each having an open port formed in said peripherally extending wall, a pair of plates removably secured to, and respectively covering the front and rear faces of, said valve body, six valves for controlling communication between said chambers, said valves being mounted upon the front one of said cover plates and being yieldably biased rearwardly therefrom to seat in closed position upon apertured areas of said partition means, said bias being sufficient to close said valves but insufficient to maintain the same closed against liquid pressure directed thereagainst in valve opening direction, a first one of said valves controlling communication between first and second ones of said chambers, a second one of said valves controlling communication between third and fourth ones of said chambers, a third one of said valves controlling communication between said third and a fifth one of said chambers, a fourth valve controlling communication between said second and a sixth one of said chambers, a fifth one of said valves controlling communication between said third chamber and a seventh one of said chambers, and a sixth one of said valves controlling communication between said first chamber and the eighth one of said chambers, and valve control means including a selectively positionable member operable for securing all of said valves against opening when said positionable member is in a first or "off" position, securing all but said first and second valves against opening when said positionable member is in a second or "service" position, securing all but said third and fourth valves against opening when said positionable member is in a third or "backwash flush" position, securing all but said first and fifth valves against opening when said positionable member is in a fourth or "rinse" position, securing all but said fourth and sixth valves against opening when said positionable member is in a fifth or "regenerate" position, securing all but said first valve against opening when said positionable member is in a sixth or "stand by" position, and securing all but said fifth valve against opening when said positionable member is in a seventh or "valve body drain" position.

References Cited in the file of this patent

UNITED STATES PATENTS

| | | |
|---|---|---|
| 2,243,815 | Griswold | May 27, 1941 |
| 2,444,471 | Samiran | July 6, 1948 |
| 2,532,143 | Breit | Nov. 28, 1950 |
| 2,596,915 | Pick | May 13, 1952 |
| 2,646,072 | Sebald | July 21, 1953 |
| 2,654,559 | Franck | Oct. 6, 1953 |
| 2,678,065 | Crookston | May 11, 1954 |
| 2,732,858 | Noon | Jan. 31, 1956 |

FOREIGN PATENTS

| | | |
|---|---|---|
| 133,067 | Australia | of 1949 |